United States Patent
Lee et al.

(10) Patent No.: US 9,449,152 B2
(45) Date of Patent: Sep. 20, 2016

(54) LICENSE ACQUISITION SCHEME INDICATION METHOD AND MOBILE TERMINAL THEREFOR

(75) Inventors: Kyung Keun Lee, Daegu (KR); Tae Hwa Choi, Seosan-si (KR); Dong Hyun Ko, Gumi-si (KR); Dong Man Kim, Gumi-si (KR); Chan Ho Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1110 days.

(21) Appl. No.: 12/221,874

(22) Filed: Aug. 7, 2008

(65) Prior Publication Data
US 2009/0043866 A1    Feb. 12, 2009

(30) Foreign Application Priority Data
Aug. 10, 2007  (KR) .................. 10-2007-0080860

(51) Int. Cl.
G06F 21/00       (2013.01)
G06F 21/10       (2013.01)

(52) U.S. Cl.
CPC .............. *G06F 21/10* (2013.01); *G06F 21/105* (2013.01)

(58) Field of Classification Search
CPC ........................................... G06F 21/10
USPC ............................................. 705/59
See application file for complete search history.

(56) References Cited

U.S. PATENT DOCUMENTS

| 7,885,894 B2 | 2/2011 | Shimoji et al. | |
|---|---|---|---|
| 2003/0023561 A1* | 1/2003 | Stefik et al. | 705/51 |
| 2003/0023564 A1* | 1/2003 | Padhye | G06F 21/10 705/54 |
| 2003/0115144 A1* | 6/2003 | Stefik | G06F 21/10 705/51 |
| 2005/0071280 A1* | 3/2005 | Irwin | H04L 9/0825 705/59 |
| 2005/0086501 A1* | 4/2005 | Woo | G06F 21/10 713/189 |
| 2007/0198430 A1* | 8/2007 | Takahashi | G06F 21/10 705/59 |

FOREIGN PATENT DOCUMENTS

| DE | 10318489 A1 * | 11/2004 | ............ G06F 21/10 |
|---|---|---|---|
| KR | 10-2002-0093193 | 12/2002 | |
| KR | 10-2006-0072461 | 6/2006 | |
| KR | 10-2007-0007017 | 1/2007 | |

* cited by examiner

*Primary Examiner* — James A Reagan

(57) ABSTRACT

A license acquisition scheme indication method and mobile terminal implemented with the license acquisition indication method is provided for informing a user of available license acquisition scheme in a current connectivity environment. A license acquisition scheme indication method of the present invention collects access information of at least one content server issuing licenses required for playing right protected files, attempts access to the at least one content server in one of a direct license acquisition scheme and an indirect license acquisition scheme on the basis of the access information, and displays identities of the individual right protected files with available license acquisition schemes determined as a result of the access attempts.

24 Claims, 7 Drawing Sheets

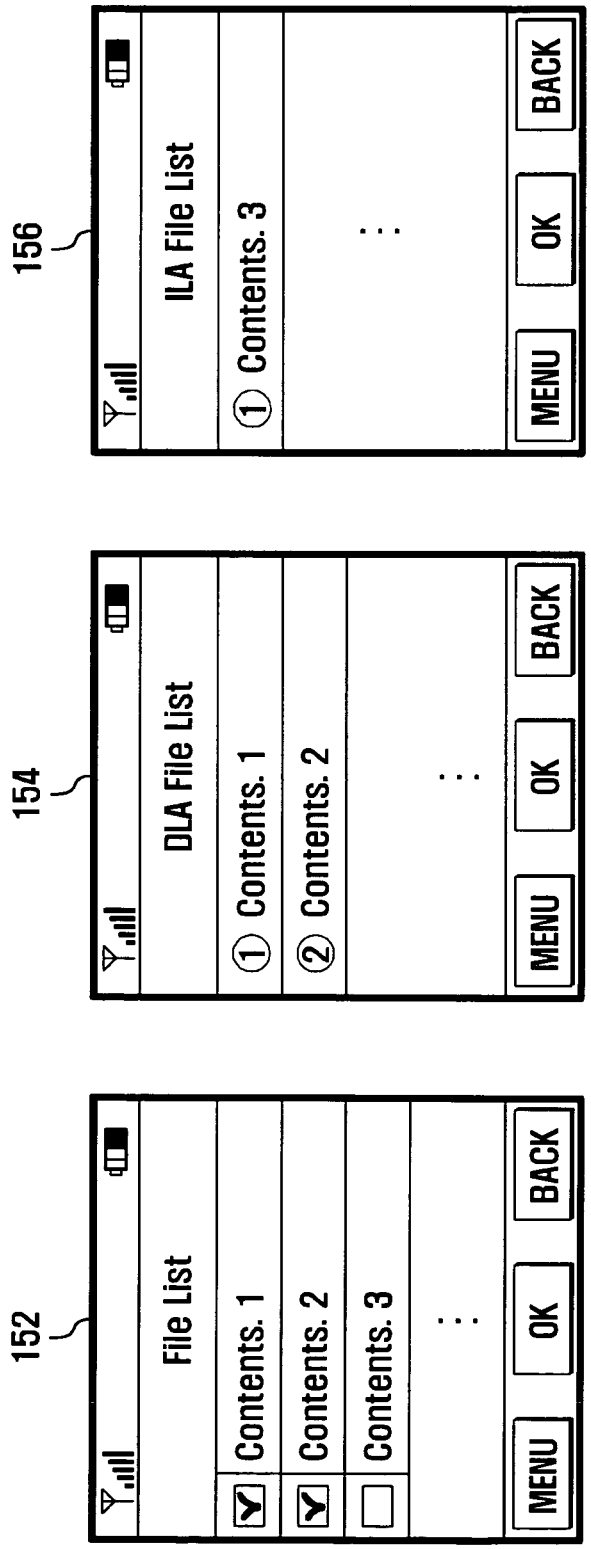

LICENSE ACQUISITION SCHEME INDICATION METHOD AND MOBILE TERMINAL THEREFOR

CROSS-REFERENCE TO RELATED APPLICATION(S) AND CLAIM OF PRIORITY

The present application claims priority to an application entitled "LICENSE ACQUISITION SCHEME INDICATION METHOD AND MOBILE TERMINAL THEREFOR" filed in the Korean Intellectual Property Office on Aug. 10, 2007 and assigned Serial No. 2007-0080860, the contents of which are incorporated herein by reference.

TECHNICAL FIELD OF THE INVENTION

The present invention relates to a digital right management (DRM) system for use with mobile terminals and, in particular, to a license acquisition scheme indication method and mobile terminal implemented with the license acquisition indication method for informing a user of available license acquisition scheme in a current connectivity environment.

BACKGROUND OF THE INVENTION

Digital rights management (DRM) comprises access control technologies that protect the intellectual property of the distributed digital media by limiting usage of digital media using encryption techniques. That is, DRM technology allows securely transmitting contents from a Content Provider (CP) to a user and protecting the contents from being illegally used and distributed.

DRM technologies attempt to protect the digital contents through all the phases of creation, distribution, use, and abrogation; and restricts access and usage rights of the user on the digital contents in online and even offline states.

In the meantime, portable devices are becoming more and more useful with various application programs advantageous for everyday life as well as their expanded storage capability while maintaining portability. Among them, mobile communication terminals such as cellular phones have become essential tools for communication.

In order to use DRM content on a portable device, the portable device has to access a content server for acquiring the DRM content and license or connects to a computer for receiving the DRM content and license downloaded from the content server. That is, the DRM content and license can be acquired in a direct license acquisition (DLA) scheme in which the portable device receives the DRM content and license from the content server or an indirect license acquisition (ILA) scheme in which the portable device receives the DRM content and license from the computer.

In a case of attempting to access to a content server, however, since the portable device does not know an access scheme supported by the content server, the portable device attempts the access to the content server according to an arbitrary access scheme it knows. Although the access attempts may succeed, they are likely to fail. That is, since the portable device does not know unavailable access conditions, it may repeat unnecessary access attempts and power checks.

SUMMARY OF THE INVENTION

To address the above-discussed deficiencies of the prior art, it is a primary object to provide a license acquisition scheme indication method and mobile terminal using the license acquisition scheme indication method that is capable of presenting an available license acquisition scheme by content server and content such that a user can acquire the license in the available license acquisition scheme.

In accordance with an exemplary embodiment of the present invention, a license acquisition scheme indication method includes collecting access information of at least one content server issuing licenses required for playing right protected files; attempting access to the at least one content server in one of a direct license acquisition scheme and an indirect license acquisition scheme on the basis of the access information; and displaying identities of the individual right protected files with available license acquisition schemes determined as a result of the access attempts.

In accordance with another exemplary embodiment of the present invention, a license acquisition scheme indication method includes checking current radio environment; determining whether the current radio environment is available for accessing a content server; and displaying an indicator informing at least one of direct license access scheme and indirect license access scheme available for acquiring a license according to a result of the determination.

In accordance with another exemplary embodiment of the present invention, a mobile terminal having a function indicating available license acquisition scheme includes a memory unit for storing right protected files and a list of identities of the right protected files, the identities mapped to access information for use in accessing at least one content server issuing licenses of the right protected files; a display unit for displaying the list; a control unit for controlling display of the list by license acquisition scheme, license acquisition scheme being one of direct license acquisition scheme and indirect license acquisition scheme; and a radio frequency unit for attempting access to the at least one content server using the access information in direct license acquisition scheme.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5a and 5b are diagrams illustrating steps of a license acquisition scheme indication method according to another exemplary embodiment of the present invention.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged digital rights management (DRM) technology.

In the following, a DRM content file is a protected content item requiring a license for playback. The DRM content file includes a Window media audio (WMA) file and a Window media video (WMV) file. In the following, a license acquisition URL (LAU) is an address of a content server issuing the license required for playing the DRM content file. The LAU is carried in a header of the DRM content file. The LAU can be a full uniform resource locator (URL) of the DRM content file or a part of the URL (i.e., a keyword). For example, the LAU can be expressed like "www.samsung.com/userid1190/contentsid" or "Samsung" as the full address. In this example, the LAU keyword can be "www.samsung.com" or "Samsung".

Although the license acquisition scheme indication method is explained in association with a mobile terminal in the following description, the present invention is not limited thereto. For example, the license acquisition scheme indication method of the present invention can be implemented with various types of portable devices that are capable of accessing to a content server, downloading DRM content and license from the content server, and laying the downloaded DRM content using the license, such as code division multiple access (CDMA) terminal, digital broadcast receiver, personal digital assistant (PDA), Smartphone, 3rd generation (3G) terminals including wideband CDMA (WCDMA) terminal and CDMA2000 terminal, global system for mobile communication (GSM) terminal, general packet radio service (GPRS) terminal, and their equivalents.

Figure 1:
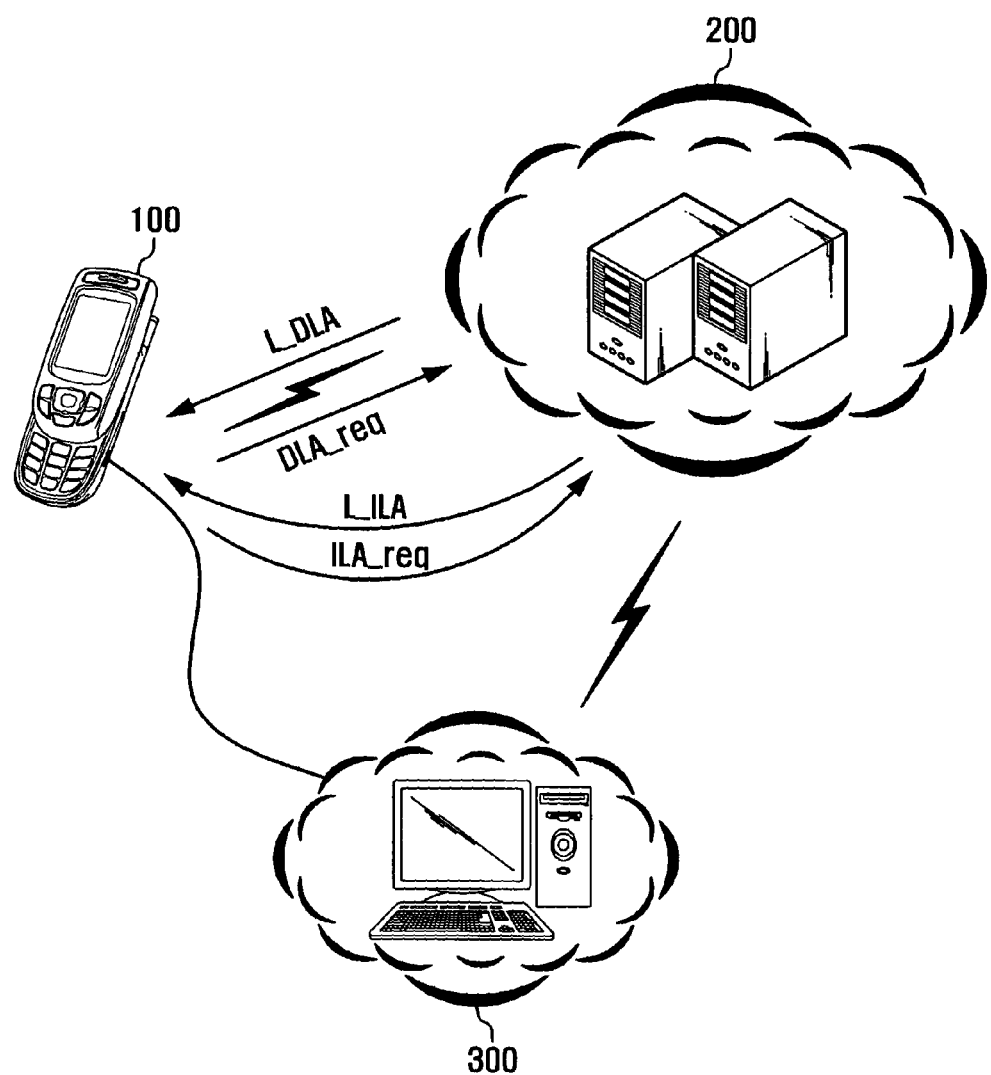
FIG. 1 is a schematic diagram illustrating a DRM system supporting a license acquisition scheme indication method according to an exemplary embodiment of the present invention.

FIG. 1 is a schematic diagram illustrating a DRM system supporting a license acquisition scheme indication method according to an exemplary embodiment of the present invention.

Referring to FIG. 1, the DRM system includes a content server 200 for providing DRM content files and licenses, a mobile terminal 100 supporting the direct license acquisition for downloading the DRM content files and licenses from the content server 200, and a computer 300 for downloading the DRM content files and licenses from the content server 200 and transferring the downloaded DRM content files and licenses to the mobile terminal 100.

The DRM contents files and licenses can be provided by the same content server or different content servers. That is, the DRM contents files can be provided by multiple individual content servers or by a representative content server designated through a negotiation. Also, the licenses can be issued by multiple individual content servers such as Internet portal service providers. Since the DRM content files and licenses are provided by individual content servers, a specific DRM content file requires a license issued by the content server which provided the DRM content file. The content server 200 can directly transfer the license to the mobile terminal 100 through a communication channel established between the content server 200 and the mobile terminal 100 or indirectly transfer the license to the mobile terminal 100 via the computer 300.

In more detail, the content server 200 can transmit the license required for playing a specific DRM content file to the mobile terminal 100 over a wireless communication system such as wireless access point (WAP) system. That is, the content server 200 transmits the license to the mobile terminal 100 in a direct license acquisition (DLA) scheme in response to a DLA request of the mobile terminal 100. In this embodiment the license acquired in the DLA scheme is called L_DLA. For this purpose, the content server 200 may include a DLA server.

The content server 200 can transmit the license required for playing a specific DRM content file to the computer 300 such that the mobile terminal 100 connects to the computer 300 through a cable by means of a USB port and downloads the license from the computer 300. That is, the mobile terminal 100 can access to the content server 200 via the computer 300 in an indirect license acquisition (ILA) scheme. For this purpose, the content server 200 may include an ILA server. In this embodiment the license acquired in the ILA scheme is called L_ILA. The content server 200 can be implemented to support both the DLA and ILA scheme.

The computer 300 can download the L_ILA from the content server 200 and transfers the L_ILA to the mobile terminal 100. In order to support the ILA scheme, the computer 300 has to support access to the content server 200 over a wired or wireless communication network. The computer 300 can be a personal desktop computer, a laptop computer, PDA, and the like supporting download and installation of client application programs.

The mobile terminal 100 can download the DRM content file from the content server 200 in a distinctive manner and acquire the license required for playing the DRM content file from the content server 200 directly or via the computer 300 indirectly. For direct license acquisition, the mobile terminal 100 can access to the content server 200 through a wireless communication network using a web browser. In the case that the content server 200 includes the DLA server, the mobile terminal 100 transmits a DLA request (DLA_req) to the content server 200 for requesting the L_DLA. Thus, the mobile terminal 100 can play the DRM content file using the L_DLA received in response to the DLA_req.

In a case that the content server 200 includes only ILA server, the mobile terminal 100 transmits an ILA request (ILA_req) to the content server 200 for requesting the L_ILA via the computer 300. Thus, the mobile terminal 100 can play the DRM content file using the L_ILA received in response to the ILA_req. Here, there can be two types of the ILA_req messages: one for requesting the computer 300 to download the L_ILA from the content server 200 and the other for requesting transfer of the downloaded L_ILA from the computer 300.

Here, the mobile terminal 100 displays information notifying which license acquisition scheme is available for accessing the content server 200 (i.e., DLA scheme or ILA scheme). Structures and functions of the mobile terminal 100 are described in more detail hereinafter with reference to drawings.

Figure 2:
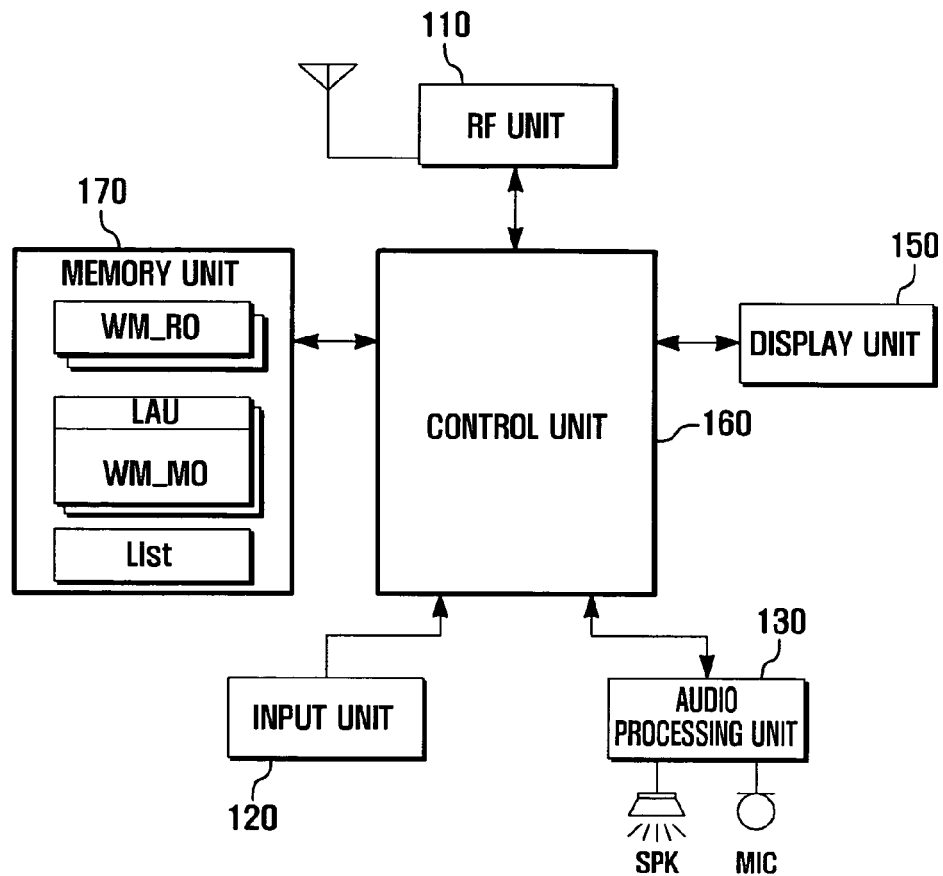
FIG. 2 is a block diagram illustrating a configuration of a mobile terminal according to an exemplary embodiment of the present invention.

FIG. 2 is a block diagram illustrating a configuration of a mobile terminal according to an exemplary embodiment of the present invention.

Referring to FIG. 2, the mobile terminal 100 includes a radio frequency (RF) unit 110, an input unit 120, an audio processing unit 130, a display unit 150, a memory unit 170, and a control unit 160.

The RF unit 110 is responsible for establishing a radio communication channel with a base station for supporting voice and data communication with another terminal. The RF unit 110 enables the mobile terminal 100 to exchange control signals with an external web server and download the content files from the web server. The RF unit 110 is provides with an RF transmitter for up-converting and amplifying the transmission signal and an RF receiver for low noise amplifying and down-converting the received signal.

Particularly in this embodiment, the RF unit 110 can download DRM content file (WM_MO) and L_DLA for playing the DRM content file (WM_MO) from the content server 200. The RF unit 110 transmits the DLA request (DLA_req) to the content server 200 in response to a user command.

The input unit 120 is provided with a plurality of alphanumeric keys for receiving alphanumeric input and functions keys for executing various functions of the mobile terminal 100. The function keys may include navigation keys, side keys, and shortcut keys designated for executing specific functions. The input unit 120 transfers a key signal corresponding to a user input associated with terminal configuration and function execution to the control unit 160.

Particularly in this embodiment, the input unit 120 is configured to generate key signals for selecting LAU and DRM content file, playing the DRM content file, controlling the playback of the DRM content file and sending the key signals to the control unit 160. The input unit 120 generates a navigation signal for navigating a cursor across LAUs listed on an LAU list or content files listed on a content file list and placing the cursor on an item of the LAU list or content file list and sends the navigation signal to the control unit 160. The item on which the cursor is placed is presented in a distinctive manner (i.e., with highlight effect or inverse effect). The item on which the cursor is placed is selected and executed in response to a selection key input. For example, when an MP3 file is selected in response to the selection key input, the mobile terminal 100 activates an MP3 playback application to play the selected MP3 file.

The audio processing unit 130 processes audio data including voice and outputs the audio data through a speaker (SPK) in the form of audible sound wave and processes the audio signal input through a microphone (MIC) and outputs the processed audio data to the control unit 160. Particularly in this embodiment, the audio processing unit 130 is configured to process the audio components contained in the DRM content file (WM_MO). Also, the audio processing unit 130 can be configured to output an alert sound for alerting license download failure, where the mobile terminal fails download of the license required for playing the DRM content file (WM_MO) in DLA scheme.

The display unit 150 provides various screen interfaces associated with operations of the mobile terminal 100 such as content server access screen, access complete screen, idle mode screen, menu screen, communication status screen, DRM content file (WM_MO) playback screen, and the like. The display unit 150 can be implemented with a liquid crystal display (LCD). In this case, the display unit 150 may include an LCD controller, a buffer memory, and LCD devices. In a case that the LCD supports a touchscreen function, the display unit 150 may act as a part of the input unit 130.

Particularly in this embodiment, the display unit 150 can be configured to display the accessibility to the content server 200 in association with the DRM content file (WM_MO). That is, the display unit 150 can display the content-specific license acquisition schemes supported by the content server 200 in the form of a list (i.e., DLA and ILA schemes available for the DRM content files (WM_MOs) stored in the memory unit 270). The display unit 150 also can display the license acquisition schemes of the content servers indicated by the LAUs extracted from the DRM content files (WM_MOs).

The LAU may contain the information on the content server from which the DRM content file is downloaded and parameters such as subscriber identity. In a case that the LAUs of the DRM content files are provided by the same content provider, the URLs have and identical part indicating the same content server 200. For example, when two of three DRM content files are provided by the same content server 200, the two DRM content files share the same part of the LAU in common. How the license acquisition schemes are displayed by the display unit 150 is described in more detail with reference to related drawings later.

The memory unit 170 stores the DRM content files (WM_MO), licenses restricting the usage right of the DRM content files (WM_MO), application programs for managing and controlling the DRM content files (WM_MO). The memory unit 170 also stores the license acquisition scheme list listing the license acquisition schemes associated with the DRM content files (WM_MO) stored in the mobile terminal 100. The license acquisition scheme list is loaded to be displayed on the screen according to a menu selection or a hot key input. The memory unit 170 can be divided into two regions: program region and data region.

The program region stores the operating system (OS) and application programs associated with the playback of the DRM content files (WM_MO), camera function, audio and video data processing function. These functions are activated in response to user commands such that the related application programs provide the functions under the control of the control unit 160. The program region also stores the web browser which the mobile terminal 100 can access the content server 200 and receive data from the content server 200. The program region also stores the application programs for enabling the mobile terminal 100 to connect to the computer 300 by means of a USB connection and communicate with the computer 300 through a cable establishing the USB connection between the mobile terminal 100 and the computer 300.

The data region stores application data, particularly, the DRM content files (WM_MO) and licenses (WM_RO) required for playing the DRM content files (WM_MO). The licenses (WM_RO) include the L_DLA downloaded in the DLA scheme and the L_ILA downloaded in the ILA scheme. The data region also stores the license acquisition scheme list created with reference to the LAUs extracted from the WM_MOs. The license acquisition scheme list is transferred to the display unit 150 under the control of the control unit 160. The data region also stores application data generated in association of the functions such as camera function, video playback function, phonebook function, and audio playback function, and user data input by the user.

The control unit 160 controls general operations of the mobile terminal and signaling among the internal components of the mobile terminal 100. The control unit 160 may include a modem and a codec for processing the data stored in the memory 150 and incoming and outgoing voice and data.

Particularly in this embodiment, the control unit 160 extracts the LAUs from the DRM content files (WM_MO) stored in the memory unit 170 and checks the license acquisition schemes (DLA and ILA schemes) supported by the content servers which have provided the DRM content files (WM_MO). In a case that the mobile terminal 100 attempts to request a license of a specific DRM content file to the content server 200 which supports only the DLA scheme, the control unit 160 controls to display an alert message, in the form of a popup window or an icon, indicating that the requested license can be downloaded in the DLA scheme. The control unit 160 also controls such that an LAU list listing the LAUs extracted from the DRM content files together with the license acquisition schemes supported by the content servers indicated by the LAUs. The LAU list can be composed so as to list keywords rather than the full URLs of the DRM contents (e.g., "samsung" for www.samsung.com/1230). The keyword of each LAU can be determined by the user or according to a specific keyword extraction algorithm. The key extraction algorithm can be implemented such that a word between first two delimiters of a URL (i.e., between "www." and next ".").

The control unit 160 can obtain the LAUs including the URL of the content servers providing the licenses (WM_RO) and keywords of the LAUs on the basis of a metering service. The metering service is of transmitting playback information of the DRM content files (WM_MO) to the content server 200. For example, the mobile terminal 100 has three DRM content files, the mobile terminal transmits the usage histories of the individual DRM content files (e.g., how many times each DRM content files is played). Using the metering service, the content server 200 can calculate the usage costs on the DRM content files (WM_MO). In order to support the metering service, the mobile terminal 100 transmits the usage history information to the content server 200 directly through a wireless communication network or via the computer 300. That is, the metering service can be provided in a direct content server access or indirect content server access manner. Accordingly, the control unit 160 can check which license acquisition scheme is supported by each content server with reference to how the metering service is provided. The control unit 160 creates the license acquisition scheme list on the basis of the metering service provision methods of the content servers. How the license acquisition scheme list is generated, displayed, and managed is described in more detail hereinafter.

In the following, three LAUs are assumed for simplifying the explanation. The number of the LAUs may be identical with a number of the DRM content files or not. This means that some DRM content files (WM_MO) and licenses may be downloaded from the same content server 200. Each LAU includes an address (i.e., URL) and additional information for accessing the content server extracted from a header of the DRM content file. In the following, the LAU can be represented by an LAU keyword extracted from the character string of a specific LAU. The LAU keyword can be generated using the information associated with the metering service as well as the information extracted from the header of the DRM content file.

Figure 3:
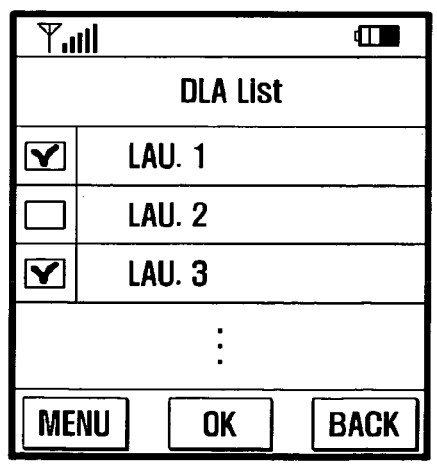
FIG. 3 is a diagram illustrating a screen image showing a direct license acquisition list for use in the mobile terminal according to an exemplary embodiment of the present invention.

FIG. 3 is a diagram illustrating a screen image showing a direct license acquisition list for use in the mobile terminal according to an exemplary embodiment of the present invention.

Referring to FIG. 3, when a user command requesting a license acquisition scheme available for the DRM contents files (WM_MO) or requesting a license acquisition on a specific DRM content file is input through the input unit 120, the control unit 160 extracts the LAUs of the DRM content files stored in the memory unit 160. Next, the control unit 160 controls such that the extracted LAUs (i.e., LAU.1, LAU.2, and LAU.3) are displayed on the display unit 150. Next, the control unit 160 attempts an access to the content server 200 in the DLA scheme on the LAU item selected on the list. If the access to the content server 200 succeeds, the control unit 160 puts a mark indicating the availability of the DLA scheme on the corresponding LAU item. At this time, the mark can be placed by a user command input through the input unit 120. The marked LAU item indicates that the license (WM_RO) of the DRM content file (WM_MO) can be acquired in the DLA scheme.

In the meantime, the control unit 160 can control to attempt an access to the content server 200 in response to a selection of one of the LAU items listed on the DLA list. That is, when the LAU.1 and LAU.3 are selected in response to the user command input through the input unit 120, the control unit 160 controls to attempt an access to the content server 200 for requesting the corresponding licenses in the DLA scheme. In order to mark the selected LAU items, the individual LAU items are provided with check boxes such that the mark is placed in the check box.

In short, the control unit 160 loads the web browser with the marked LAU.1 including the domain name of the content server 200 and attempts to access the content server 200. Next, the control unit 160 requests the license (WM_RO) to the DLA server of the content server 200 using the detailed information included in the LAU.1 and additional information such as the content server and user identity. At this time, the mobile terminal 100 may perform a cost settlement process.

As described above, in a license acquisition procedure, the mobile terminal 100 displays the LAUs extracted from the DRM content files (WM_MO) stored in the memory unit 170 and attempts access to the content server 200 with reference to the LAU selected by the user in DLA scheme. The DLA list can be created with reference to the LAUs and LAU keywords obtained during the metering service procedure.

Figure 4A:
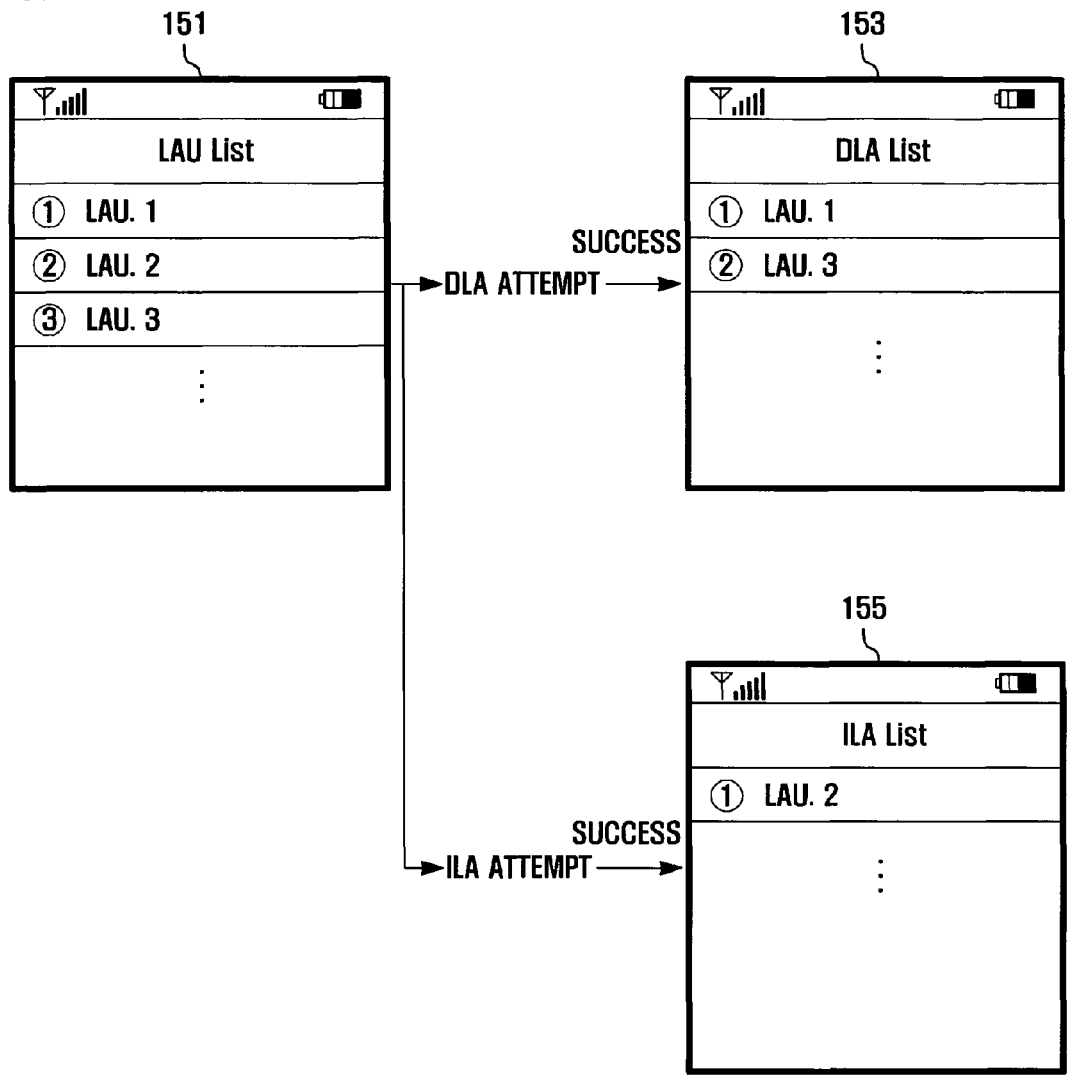
FIGS. 4a and 4b are diagrams illustrating steps of a license acquisition scheme indication method according to an exemplary embodiment of the present invention.

FIG. 4a is a diagram illustrating steps of a license acquisition scheme indication method according to an exemplary embodiment of the present invention.

Referring to FIG. 4a, the mobile terminal 100 extracts the LAUs of the DRM content files stored in the memory unit 170 in response to a user command input through the input unit 120 and displays the extracted LAUs in the form of a list as shown in the screen image 151. Next, the control unit 160 attempts access to the content server 200 using the LAUs (i.e., LAU.1, LAU.2, and LAU.3) listed on the LAU list in the DLA scheme. After completing the access attempts, the control unit 160 classifies the LAUs into DLA-available LAUs and DLA-unavailable LAUs according to whether the access attempts have succeeded or failed with the individual LAUs. Consequently, the control unit 160 creates a DLA list with the DLA-available LAUs and displays the DLA list on the display unit 150 as shown in the screen image 153. Meanwhile, the control unit 160 can attempt access to the content server with reference to LAUs listed on the DLA list. The control unit 160 also creates an ILA list with the DLA-unavailable LAUs as shown in the screen image 155. The ILA list may be created as a result ILA scheme-based content server access attempt. The DLA list and ILA list can be displayed in response to a user command input through the input unit 120. Following the display of the LAU list screen 151, one of the DLA list screen 153 and the ILA list screen 155 can be displayed as a default option. Also, the DLA and ILA list screens 153 and 155 can be switched with respect to each other according to the selection command input by the user. Also, the display unit 150 can display the LAU list screen 151 back again according to a user command.

Figure 4B:
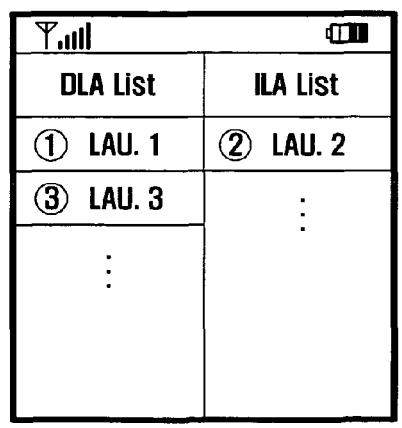

Although the DLA and ILA lists are individually displayed as different screens in this embodiment, the present invention is not limited thereto. For example, the DLA and ILA lists can be displayed on a single screen simultaneously as shown in FIG. 4b. In more detail, the control unit 160 can create an LAU list screen on which the DLA list is presented at the left half of the screen and the ILA list is presented at the right half of the screen. Preferably, the DLA list and ILA list can be assigned the presentation areas having identical size. In the meantime, the LAUs listed on the DLA list and ILA list maintain their index numbers as in the LAU list shown in the screen image 151. That is, the LAU.1 and LAU.3 listed in the DLA list maintain their index number ① and ③ designated in the LAU list, and the LAU.2 listed in the ILA list maintains its index number ② designated in the LAU list.

FIG. 5a is a diagram illustrating steps of a license acquisition scheme indication method according to another exemplary embodiment of the present invention.

Referring to the screen image 152 of FIG. 5a, the mobile terminal 100 extracts identities (e.g., file names) of the DRM content files (WM_MO) stored in the memory unit 170 and creates a file list listing the identities. That is, the control unit 160 displays the file names of the DRM content files stored in the memory unit 170 in the form of a file list and attempts access to the content server 200 for acquiring a license (WM_RO) of a DRM content file (WM_MOR) selected from the file list in a DLA scheme. In order to mark selection of DRM content files, the file list arranges the file names of the DRM content files (e.g., content.1, content.2, and content.3) together with respective check boxes. Preferably, the control unit 160 maps the file names of the DRM content files to the address of the content server 200 such that, when a file name is selected, the control unit 160 refers to the address mapped to the file name.

In this embodiment, the control unit 160 classifies the DRM content files (WM_MO) stored in the memory 170 according to the license acquisition schemes available for them and displays the DRM content files by license acquisition scheme. First, the control unit 160 of the mobile terminal 100 determines the license acquisition schemes available for the individual DRM content files (WM_MO) stored in the memory unit 170 with reference to their LAUs. Next, the control unit 160 classifies the DRM content files (WM_MO) by available license acquisition scheme and generates a DLA file list listing the DRM content files (i.e., their file names) of which licenses can be acquired in the DLA scheme and a ILA file list listing the DRM content files (i.e., their file names) of which licenses can be acquired in the ILA scheme. In a case of a DRM content file (WM_MO) of which a license can be acquired in both the DLA and ILA schemes, its file name can be listed on the DLA file list and the ILA file list.

In order to acquire the licenses (WM_RO) of the DRM content files using the DLA file list as shown in the screen image 154, the control unit 160 can control the display unit 150 to display the file list shown in the screen image 152 back such that the user selects the DRM content files (WM_MO) of which licenses are wanted to be acquired in the DLA scheme. Also, in a case of attempting acquisition of licenses of the DRM content files in the screen image 156, the control unit 160 controls the display unit 150 to display a popup message for notifying the ILA process status (i.e., connectivity to the computer 300).

In this embodiment, the license acquisition scheme indication method generates and displays a DLA file list and an ILA file list listing the DRM content files stored in the memory unit 170 by available license acquisition scheme, whereby the user can easily recognize which license acquisition scheme is available for individual DRM content files.

Figure 5B:
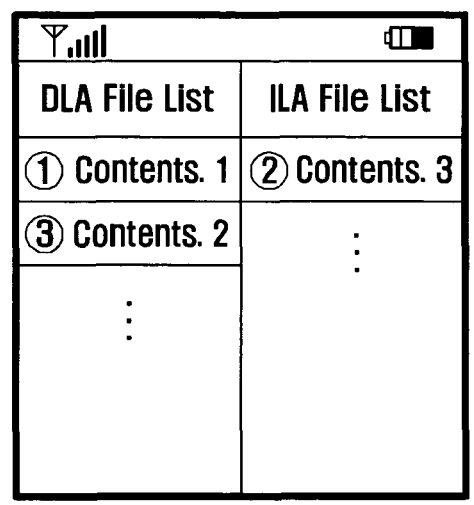

The display of the DLA file list and ILA file list can be displayed on a single screen simultaneously as shown in FIG. 5b. That is, the display unit 150 can be configured to display the DLA file list at the left half of the screen and the ILA file list at the right half of the screen. Here, the DRM content files listed on the DLA file list and the ILA file list maintain the same index numbers as in the file list shown in the screen image 152. That is, the content.1 and content.2 listed in the DLA file list maintain their index number ① and ② designated in the file list, and the content.3 listed in the ILA file list maintains its index number ③ designated in the file list.

As described above, the license acquisition scheme indication method according to this embodiment classifies the DRM content files by available license acquisition scheme and displays in the forms of DLA file list and ILA file list with consistent index numbers, thereby facilitating recognition of the characteristics of the DRM content files and acquisitions of the licenses.

Figure 6:
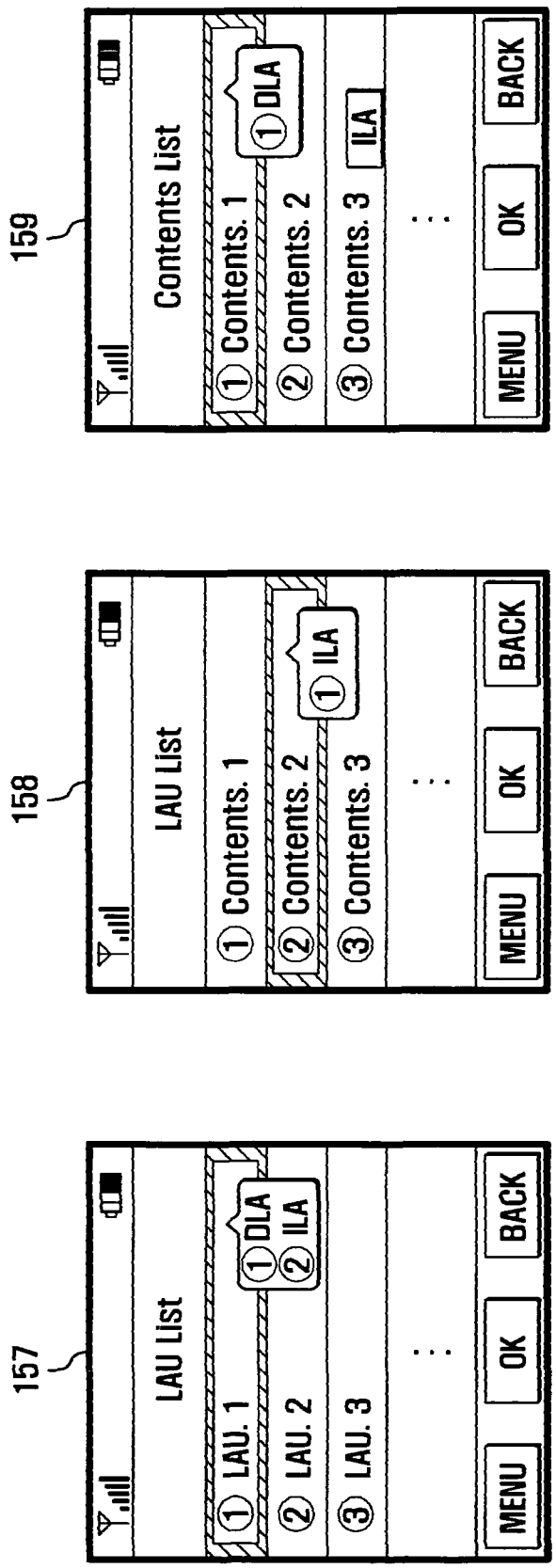
FIG. 6 is a diagram illustrating steps of a license acquisition scheme indication method according to another exemplary embodiment of the present invention.

FIG. 6 is a diagram illustrating steps of a license acquisition scheme indication method according to another exemplary embodiment of the present invention.

Referring to FIG. 6, the mobile terminal 100 according to an embodiment of the present invention displays the LAUs extracted from the DRM contents files (WM_MO) in the form of a list and, when the cursor is placed on an LAU, shows at least one license acquisition scheme available for the LAU (i.e., DLA and ILA schemes). In more detail, the control unit 160 of the mobile terminal 100 generates an LAU list listing a plurality of LAUs (in this embodiment, LAU.1, LAU.2, and LAU.3) and, when the cursor is navigated and placed on an LAU (LAU.1 in the screen image 157) in response to a user command input through the input unit 120, presents at least one available license acquisition scheme (DLA and ILA for the LAU.1 in the screen image 157) of the LAU in a popup window. As shown in the screen image 157 of FIG. 6, the popup window indicates that the license of the LAU.1 can be acquired in the DLA and ILA schemes. In order to generate the LAU list, it is preferred that the control unit 160 checks the license acquisition schemes available for the individual LAUs in advance and manages the LAUs in association with available license acquisition schemes in the form of a database. The LAUs of the LAU list can be replaced with corresponding file names of the DRM content files mapped to the LAUs as shown in the screen image 158 such that, when a file name is selected, the control unit 160 attempts access to the content server 200 with reference to the LAU mapped to the file name.

In the screen image 158 of FIG. 6, the cursor is navigated and placed on a file name (content.2) mapped to the LAU.2 such that the control unit 160 controls to present ILA as the license acquisition scheme available for the DRM content item named content.2 in the popup window. Accordingly, when it is required to acquire the license of the content.2, the control unit 160 checks the connection state of the mobile terminal 100 to the computer 300 and alerts the connection state. When the mobile terminal 100 is not connected to the computer 300, the control unit 160 may output a connection alert in the form of a popup message.

As shown in the screen image 159 of FIG. 6, the mobile terminal 100 can control to generate a contents list listing the identities (e.g., file names) of the DRM content files stored in the memory unit 170 and, when the cursor is navigated and placed on a file name, present the license acquisition scheme available for the DRM content file having the file name. In the screen image 159, the cursor is placed on the content.1 such that the control unit 160 displays a popup window presenting DLA which is the license acquisition scheme available for the DRM content item named content.1.

Also, the content list can be configured to display the files names together with the license acquisition schemes available for the individual DRM content files as shown in the screen image 159.

As described above, the license acquisition scheme indication method according to this embodiment generates a LAU list listing the LAUs of the DRM content files or a content list listing the identities (file names) of the DRM content files and presents the license acquisition schemes available for the DRM content files at one side of the LAUs or file names, or in the form of a popup window when the cursor is placed on an LAU or file name. Accordingly, the user of the mobile terminal 100 can intuitively recognize the license acquisition schemes available for the individual DRM content items and efficiently acquire the licenses. The LAUs can be directly extracted from the DRM content files (WM_MO) or obtained while performing a process associated with the metering service.

Figure 7:
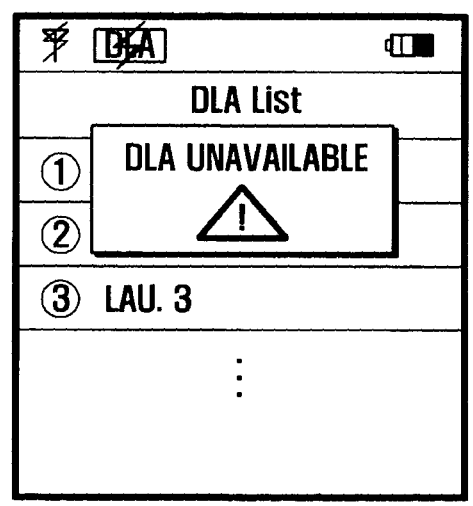
FIG. 7 is a diagram illustrating steps of a license acquisition scheme indication method according to another exemplary embodiment of the present invention.

FIG. 7 is a diagram illustrating steps of a license acquisition scheme indication method according to another exemplary embodiment of the present invention.

Referring to FIG. 7, the mobile terminal 100 according an embodiment of the present invention checks its radio environment, determines whether the current radio environment is available for downloading the licenses (WM_RO) in the DLA scheme, and displays the determination result at one side of the display unit 150. In a case that the radio environment is unavailable for the DLA, the control unit 160 of the mobile terminal 100 displays an icon indicating the DLA is unavailable at one side of the screen. When a DLA attempt is detected in spite of the bad radio environment, the control unit 160 controls such that an alert message notifying the user of the DLA unavailability in the form of a popup window.

In this embodiment, the mobile terminal 100 monitors its radio environment and informs the radio environment information using a received signal indication icon presented at one side of the screen and using an alert message when a DLA is attempted by the user, whereby the user can intuitively recognize the availability of the license acquisition based on the DLA scheme.

Although the license acquisition scheme indication method is described in association with a single content server as a fixed network element, the present invention is not limited thereto. For example, when the mobile terminal has downloaded a DRM content file from a content server located in Korea and attempts to acquire the license required for playing the DRM content file in the United States, the mobile terminal can obtain its position information, discover an accessible content server around the current position, and attempt access to the content server for downloading the license. The mobile terminal 100 can obtain its position information using a global positioning system (GPS) and base station information. The mobile terminal 100 can be configured to access content servers located in Korean and other countries such as the United States for downloading the license. For this purpose, the mobile terminal extracts the LAU keyword of the DRM content files, searches for the content servers of which addresses are matched with the LAU keyword on a content server list, retrieves a content server available at the current position on the basis of IP address system, and establishes a connection with the retrieved content server. In short, the mobile terminal can discover a content server accessible for acquiring the license around the current location.

Although the license acquisition scheme indication method is described mainly with the DLA scheme, the method can be implemented with the ILA scheme in the same manner. That is, the license acquisition scheme indication method can be implemented such that the LAU list and content list are created as a result of the access attempts to the content server.

As described above, the license acquisition scheme indication method and mobile terminal adopting the license acquisition scheme indication method allows the user to intuitively recognize a license acquisition scheme available for a specific DRM content file in association with a content server.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile terminal having a function indicating an available license acquisition scheme, the mobile terminal comprising:
   a memory unit configured to store right protected files and a list of identities of the right protected files, the identities mapped to an access information for use in accessing at least one content server issuing licenses for the right protected files;
   a display unit configured to display the list;
   a control unit configured to determine the available license acquisition scheme among a plurality of license acquisition schemes for each of the right protected files, and to control a display of the list for notifying the available license acquisition scheme of the right protected files, the plurality of license acquisition schemes comprising (i) a direct license acquisition scheme associated with a transfer of licenses directly from a content server to the mobile terminal, and (ii) an indirect license acquisition scheme associated with a transfer of licenses indirectly from the content server through a computer to the mobile terminal; and a radio frequency unit configured to attempt access to the at least one content server using the access information in the direct license acquisition scheme.

2. The mobile terminal of claim 1, wherein the control unit extracts the access information from at least one of a header of one of the right protected files and a content playback history information transmitted to the content server in a metering service.

3. The mobile terminal of claim 1, wherein the access information comprises at least one of a universal resource locator (URL) of the at least one content server, a keyword extracted from the URL, and an identity of the right protected file.

4. The mobile terminal of claim 2, wherein an identity of the one of the right protected files is mapped to a universal resource locator (URL) of the content server.

5. The mobile terminal of claim 1, further comprising an input unit configured to receive a user input for navigating a cursor across the identities, wherein the display unit displays the identities of the right protected files with a direct license acquisition scheme indicator or an indirect license acquisition scheme indicator as the result of the access attempts.

6. The mobile terminal of claim 1, wherein the display unit displays the identities of the right protected files, for which access attempts succeed in the direct license acquisition scheme, with a direct license acquisition scheme indicator.

7. The mobile terminal of claim 1, wherein the display unit displays a first list listing the identities of the right protected files for which access attempts succeed in the direct license acquisition scheme and a second list listing the identities of the right protected files for which access attempts succeed in the indirect license acquisition scheme.

8. The mobile terminal of claim 1, wherein the display unit displays, when a cursor is placed on an identity of the list, a popup window and presents a text indicating at least one of the direct and the indirect license acquisition schemes available for the right protected file represented by the identity in the popup window.

9. The mobile terminal of claim 1, wherein the display unit displays each identity with at least one of the direct and the indirect license acquisition scheme available for the right protected file represented by the identity.

10. The mobile terminal of claim 1, wherein the control unit monitors a current radio environment, determines whether the current radio environment is available for accessing a content server, and displays an indicator informing at least one of the direct license acquisition scheme and the indirect license acquisition scheme available for acquiring a license according to a result of the determination.

11. The mobile terminal of claim 10, wherein the indicator is an icon fixed at a position on a screen.

12. The mobile terminal of claim 10, wherein the control unit extracts the access information required for accessing at least one content server and displays the access information in the form a list with a popup message indicating availability of a specific license acquisition scheme.

13. A method for indicating available license acquisition schemes in a mobile terminal, the method comprising:
storing right protected files and a list of identities of the right protected files, the identities mapped to an access information for use in accessing at least one content server issuing licenses for the right protected files;
determining an available license acquisition scheme among a plurality of license acquisition schemes for each of the right protected files, the plurality of license acquisition schemes comprising (i) a direct license acquisition scheme associated with a transfer of licenses directly from a content server to the mobile terminal, and (ii) an indirect license acquisition scheme associated with a transfer of licenses indirectly from the content server through a computer to the mobile terminal;
displaying the list for notifying the available license acquisition scheme of the right protected files; and
attempting access to the at least one content server using the access information in the direct license acquisition scheme.

14. The method of claim 13, wherein the access information is extracted from at least one of a header of one of the right protected files and a content playback history information transmitted to the content server in a metering service.

15. The method of claim 14, wherein the access information comprises at least one of a universal resource locator (URL) of the at least one content server, a keyword extracted from the URL, and an identity of the right protected file.

16. The method of claim 14, wherein an identity of the one of the right protected files is mapped to a universal resource locator (URL) of the content server.

17. The method of claim 13, further comprising receiving a user input for navigating a cursor across the identities, wherein the identities of the right protected files are displayed with a direct license acquisition scheme indicator or an indirect license acquisition scheme indicator as the result of the access attempts.

18. The method of claim 13, wherein the identities of the right protected files, for which access attempts succeed in the direct license acquisition scheme, are displayed with a direct license acquisition scheme indicator.

19. The method of claim 13, wherein a first list listing the identities of the right protected files for which access attempts succeed in the direct license acquisition scheme is displayed and a second list listing the identities of the right protected files for which access attempts succeed in the indirect license acquisition scheme is displayed.

20. The method of claim 13, wherein when a cursor is placed on an identity of the list, a popup window and a text indicating at least one of the direct and the indirect license acquisition schemes available for the right protected file represented by the identity in the popup window are displayed.

21. The method of claim 13, wherein each identity with at least one of the direct and the indirect license acquisition scheme available for the right protected file represented by the identity are displayed.

22. The method of claim 13, further comprising:
monitoring a current radio environment;
determining whether the current radio environment is available for accessing a content server; and
displaying an indicator informing at least one of the direct license acquisition scheme and the indirect license acquisition scheme available for acquiring a license according to a result of the determination.

23. The method of claim 22, wherein the indicator is an icon fixed at a position on a screen.

24. The method of claim 22, wherein the access information required for accessing at least one content server is extracted and the access information is displayed in the form a list with a popup message indicating availability of a specific license acquisition scheme.

* * * * *